United States Patent
Lee

(10) Patent No.: US 6,722,804 B2
(45) Date of Patent: Apr. 20, 2004

(54) APPLIQUE PACKAGE AND METHOD OF MANUFACTURE

(76) Inventor: Jennifer Paulson Lee, 81 Nethermont Ave., North White Plains, NY (US) 10603

( * ) Notice: Subject to any disclaimer, the term of this patent is extended or adjusted under 35 U.S.C. 154(b) by 0 days.

(21) Appl. No.: 10/354,217

(22) Filed: Jan. 29, 2003

(65) Prior Publication Data

US 2003/0156885 A1 Aug. 21, 2003

Related U.S. Application Data

(60) Provisional application No. 60/357,363, filed on Feb. 15, 2002.

(51) Int. Cl.[7] .............................................. A46B 11/00
(52) U.S. Cl. ........................ 401/126; 401/122; 401/121
(58) Field of Search ................................. 401/118, 121, 401/122, 126, 129, 130

(56) References Cited

U.S. PATENT DOCUMENTS 4,810,122 A * 3/1989 Cole .......................... 401/122
6,287,034 B1 * 9/2001 Miraglia et al. ............ 401/122

FOREIGN PATENT DOCUMENTS

WO    WO 98/00045    * 1/1998 .................. 401/122

* cited by examiner

Primary Examiner—David J. Walczak
(74) Attorney, Agent, or Firm—Morgan & Finnegan, LLP

(57) ABSTRACT

A package for storing and dispensing a desired amount of an applique on an applicator, such as a tube of mascara, includes a self-supporting, deformable sleeve mounted intermediate the applique reservoir and a cap member for closing the package when the applicator is adjacent the bottom of the reservoir. The sleeve member includes an open-ended passageway communicating with the reservoir and is fixedly and sealingly mounted to a housing for the reservoir. In one embodiment, the cap member fits over and about the sleeve member and is removably secured to the outer surface of the reservoir housing; when secured, the sleeve member sealingly engages the inner end surface of the cap member. In an alternative embodiment, the cap member is removably secured to a rigid relatively thin, plate member which, in turn, is fixedly and sealingly mounted to the end of the sleeve member opposite the housing member so as to leave the exterior surface of the sleeve member exposed to view when the package is closed. The flexible sleeve preferably is transparent, includes a series of grooves along the internal surface of the passageway and has a concave outer peripheral surface. The flexible sleeve member preferably is sealingly affixed to each of the reservoir housing and rigid plate members during the sleeve molding operation.

4 Claims, 18 Drawing Sheets

APPLIQUE PACKAGE AND METHOD OF MANUFACTURE

This application claims priority to U.S. Provisional Application Serial No. 60/357,363, filed Feb. 15, 2002, entitled "IMPROVED APPLIQUE PACKAGE AND METHOD OF MANUFACTURE" by the same inventor of the instant Non-Provisional Application, and which is hereby incorporated by reference.

FIELD OF THE INVENTION

The present invention is directed generally to a product for containing and applying an applique material, such as ink, paint or mascara, or other flowable material, including fluids, pastes and finely granulated products, and more particularly to a new and improved product for removing excess applique from an applicator, such as a brush or swab, and to a new and improved method for the manufacture of such a product.

OBJECTS OF THE INVENTION

It is an object of this invention to provide an improved system for containing and applying an applique material and for removing excess applique from an applicator utilizing a flexible-walled, self-supporting, deformable sleeve-like segment which may be squeezed and manipulated by finger pressure against the applicator as it is removed from a quantity of applique material, as described and illustrated in U.S. Pat. No. 6,264,390, the disclosure of which is hereby incorporated by reference.

A further object of the present invention is to provide an improved product for containing and applying an applique material which permits use of a flexible-walled, self-supporting, sleeve-like segment deformable by finger pressure, and which also reduces the possibility of either the flexible segment or the applique material drying out between uses of the applique material, or before the applique container is emptied.

A further object of the present invention is to provide an improved product for containing and applying an applique material which permits use of a flexible-walled, self-supporting, deformable sleeve member which may be deformed by applying finger pressure to the exterior surface thereof so as to allow the consumer to continuously vary the amount of applique on the applicator, ranging from application of light finger pressure—providing a minimal wipe of excess applique, to maximum finger pressure—virtually cleaning the applicator of applique material.

A further object of the present invention is to provide a novel and improved method for manufacturing a package for containing an applique material, such as, e.g., ink, paint, polish, glitter or mascara, and for applying such a material by an applicator, such as, e.g., a bristle brush or a sponge swab, and which includes a flexible-walled, self-supporting, sleeve-like segment deformable by finger pressure for removing excess applique material from the applicator prior to removal of the applicator from the container housing the applique material.

BACKGROUND OF THE INVENTION

Heretofore, those working in the cosmetic industry have concentrated their efforts on specializing designs for the applicator brush or bristles, or techniques for mounting the brush bristles to the applicator rod and/or to the mascara formula itself. The apparent goal of these prior attempts has been to provide the consumer with a single, specific mascara product that will solve or provide for the needs and/or aesthetic taste of every consumer. These prior mascara products have had numerous shortcomings and disadvantages, primarily because they have not permitted the individual user to vary or tailor the mascara product to suit her desired purpose or aesthetic taste.

More particularly, prior mascara formulas have tended to be relatively thick in order to assure that the mascara liquid will remain on the brush when it is removed from the container. This requires the user to first wipe and twist the brush against the open lip of the mascara reservoir and/or, often thereafter, to additionally wipe or blot the brush on a facial tissue or other paper or cloth before applying the mascara to the eyelashes. As a result, dried mascara quickly builds up on the end of the mascara tube and clumps of mascara—formed from dried mascara and/or foreign paper or lint debris falling into the mascara reservoir or brought in by the brush—soon appear in the mascara reservoir, and from there onto the eyelashes, causing both an unsightly appearance and irritation to the eyes. Because of these difficulties and annoyances, a tube of mascara often must be discarded long before it is emptied, adding to the disadvantages of the prior products.

In addition, although much effort has been concentrated on brush designs intended to provide the most desirable spreading of mascara onto the eyelashes, these efforts heretofore have been rendered largely inoperative because of the inability to effectively remove excess mascara from the brush bristles without introducing foreign matter into the mascara. For example, the forward or distal end of the brush bristles typically are of decreased length to enable application of mascara to the innermost lashes, but these shorter bristles often end up with unwanted excess mascara carried over from the longer bristles, a problem known in the cosmetic industry as a "tailing". This tailing of excess mascara is either wasted, if it is removed by wiping or blotting on tissue or the like, or it interferes with the proper use of the shorter brush bristles. Another unwanted result of this tailing often occurs when it smudges on the side of the nose as the user attempts to apply mascara on the innermost eyelashes.

In contrast, the provision of a flexible sleeve embodying the present invention mounted at the open end of the mascara reservoir places control of the mascara application in the hands of each consumer, enabling each consumer to achieve essentially an infinite range of variability of mascara application with a given brush and a given mascara formula. This, in turn, has the advantage of much less costly brush and/or mascara development and manufacture. For example, thinner mascara formulas may be used without fear of the mascara dripping off the brush because the flexible control sleeve can be manipulated in a continuously varying manner so as to wipe and drain excess mascara back into the housing; thicker mascara formulas also may be used successfully by applying a lighter, or minimal, finger pressure to the control sleeve on initial applications to the lashes and then applying a firmer, or maximum, finger pressure to the control sleeve for the final applications, leaving either less mascara on the brush or essentially wiping the brush clean. In this way, the amount of mascara applied to the eyelashes may be controlled by the user as desired. A tight squeeze during final applications of mascara advantageously may permit the brush bristles to provide a feathering or combing effect to the eyelashes, which tends to separate and/or spread each lash from the others, providing the desired full—bodied appearance to the eyelashes.

It will be seen that the flexible control sleeve as here embodied thus solves the tailing problem that has long plagued the cosmetic industry. The provision of a sleeve that can be manipulated by finger pressure allows excess mascara to be removed evenly, or as otherwise desired, along the entire length of the brush, whether the bristles are longer or shorter. In fact, it has been found that the bristles of mascara brushes transmit a tactile sensation through the wall of the flexible sleeve embodying my invention to the fingers, enabling the user to feel the location of the brush and thereby "pinch off" the mascara tailing with increased finger pressure as the end of the brush is drawn through the flexible sleeve. This ability to feel the mascara brush bristles, in turn, serves to effectuate the intended operation of various specialized bristle arrangements, which heretofore has not been possible with the mascara containers utilized in the cosmetic industry. Furthermore, in the embodiment of my invention where the flexible control sleeve is formed from a transparent material, the user has the added advantage of being able to see the amount of mascara, or other applique material, being removed from the applicator as it is in the process of being withdrawn through the control sleeve.

The provision of a flexible control sleeve as here embodied also has been found to be highly advantageous because excess mascara wiped from the brush always stays inside the reservoir housing, which prevents or retards premature drying and/or clumping of the mascara. In addition, because facial tissue or other external wiping cloth is not required to remove excess mascara from the brush, foreign material is kept outside the mascara reservoir, reducing or totally eliminating the formation of clumps in the mascara fluid.

Finally, because all excess mascara during each use remains in the reservoir, and because premature drying and clumping is prevented, or at least retarded, the present invention is also advantageous in reducing or eliminating wastage of the mascara.

While the present invention was conceived and developed primarily for use in the cosmetic industry, and particularly for the application of mascara, its advantages are not limited to either mascara or cosmetics. Instead, the foregoing objects and specific advantages of the invention as applied to a mascara product are illustrative of those which can be achieved by the present invention and are not intended to be exhaustive or limiting of the possible advantages which may be realized with other fluid, paste or finely granulated products and in other industries, such as inks, paints or polishes. Thus, these and other objects and advantages of the invention will be apparent from the description herein or can be learned from practicing the invention, both as embodied herein or as modified in view of any variations which may be apparent to those of ordinary skill in the inking, painting, crafts, cosmetic and/or molding arts, the same being realized and attained by means of the parts, constructions and instrumentations, and combinations thereof, as well as in the steps and processes pointed out in the appended claims. The present invention resides in the novel parts, constructions, arrangements, combinations, steps and processes, and improvements, herein shown and described.

SUMMARY OF THE INVENTION

In accordance with one embodiment of the present invention, a package is provided for storing and dispensing a fluid applique material, such as mascara, onto an applicator, such as brush bristles. The applique is contained in a housing reservoir and the applicator is provided at the distal end of a rod mounted internally within a cap member, such that the applicator rests adjacent to the bottom of the reservoir when the cap member is secured to the housing member to close the package.

A flexible deformable sleeve member preferably is formed from a moldable material and is molded directly to the housing member so as to provide a sealed connection between the flexible sleeve and reservoir housing. Alternatively, the sleeve may be molded as a separate unit and thereafter assembled to the housing member, which may be found advantageous in permitting the housing reservoir to be filled with applique material before assembly of the sleeve to the housing member.

The flexible sleeve includes an open-ended passageway communicating at one end with the applique reservoir, the passageway adapted to receive the applicator therethrough substantially without interference when the sleeve is in its undeformed state. In this embodiment, the cap member is adapted to fit over and about the sleeve member and to be removably secured to the outer surface of the housing member to close the package. When closed, the free end of the sleeve member sealingly engages the inner end surface of the cap member.

In an alternate embodiment of the invention, the free end of the sleeve member is molded and/or bonded directly to a rigid, relatively thin plate member and the cap member is adapted to be secured to the plate member to thereby close the package. In this embodiment, the sleeve member forms an intermediate exterior surface of the package that is sealed at each of its opposed end surfaces between the cap and housing members.

In preferred embodiments of the invention, the internal passageway of the sleeve member includes a series of circular thread-like grooves and ridges, and the exterior wall of the sleeve member is narrowed to provide a central concave surface facilitating gripping, squeezing and/or manipulating the sleeve, and thus the inner passageway, against the applicator so as to enable the user to dispense the desired amount of applique on the applicator. Also, preferably, the flexible sleeve is moldable from an elastomeric material which is transparent and self-supporting after molding, and has sufficient tensile and tear strength to resist tearing upon twisting or other manipulation of the sleeve. In still other preferred embodiments of the invention, especially where the flexible sleeve forms an intermediate exterior surface of the package, the sleeve advantageously may incorporate different tints of color, pigment, glitter, etc., either as decoration or serving to identify the contents of the package.

DETAILED DESCRIPTION OF THE PREFERRED EMBODIMENTS

Figure 1:
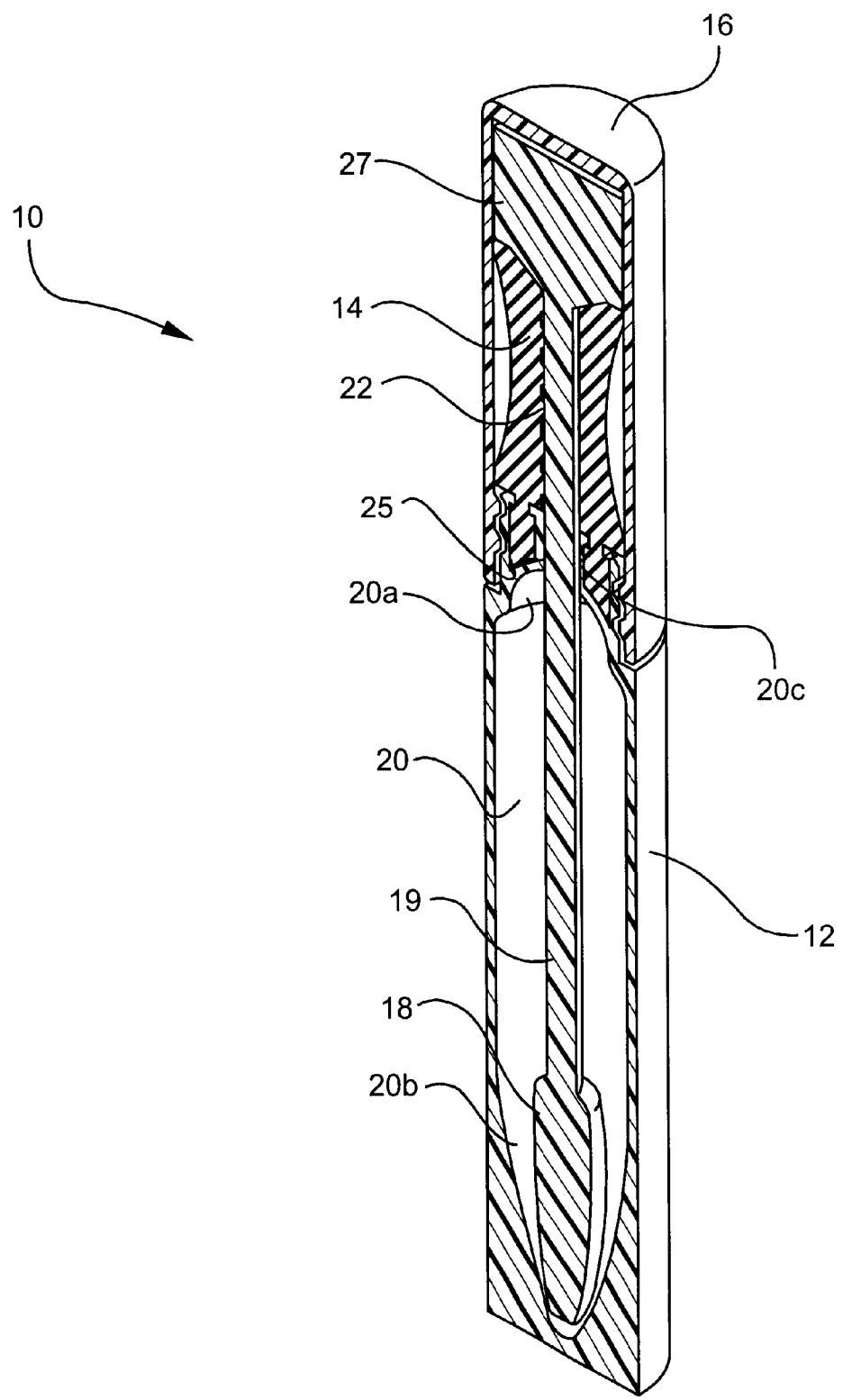
FIG. 1 is a line drawing taken generally in longitudinal section, partly in perspective, of an applique housing, flexible walled deformable segment, cap member and applicator brush constructed in accordance with a preferred embodiment of my invention.

Referring now more particularly to the accompanying drawings, a preferred embodiment of my invention is shown in FIG. 1, illustrating a container 10 for storing an eyelash mascara product and for applying such product to the eyelashes. As preferably embodied, container 10 includes a generally tubular, elongated housing 12 in which the mascara product is stored, a flexible-walled, yet self-supporting, generally cylindrical sleeve segment 14 suitably secured to the open end of the housing 12 and a cap member 16 adapted to fit over and around sleeve 14 and to be suitably removably secured to housing 12. An applicator 18, such as a brush, swab or the like, mounted at the distal end of a rod 19 is suitably attached to the closed end portion of cap 16.

Advantageously, and as preferably embodied, housing 12 includes an interior elongated chamber 20 which is gently sloped at each end 20*a*, 20*b* to prevent accumulation of mascara product within housing 12. Chamber 20 communicates at its end 20*a* with a narrowed central passageway 20*c*, which, in turn, communicates with a central passageway 22 formed in flexible sleeve 14. As will be understood, applicator 18 is adapted to pass through passageway 22, 20*c*, and into and out of the mascara chamber 20 upon securing and removing cap 16 to or from housing 12. Advantageously, at least that portion of cap 16 which encompasses the flexible sleeve segment 14 may be formed from a transparent material, such as a transparent plastic, to thereby allow viewing of the flexible sleeve when the cap is secured to the housing member.

Figure 1A:
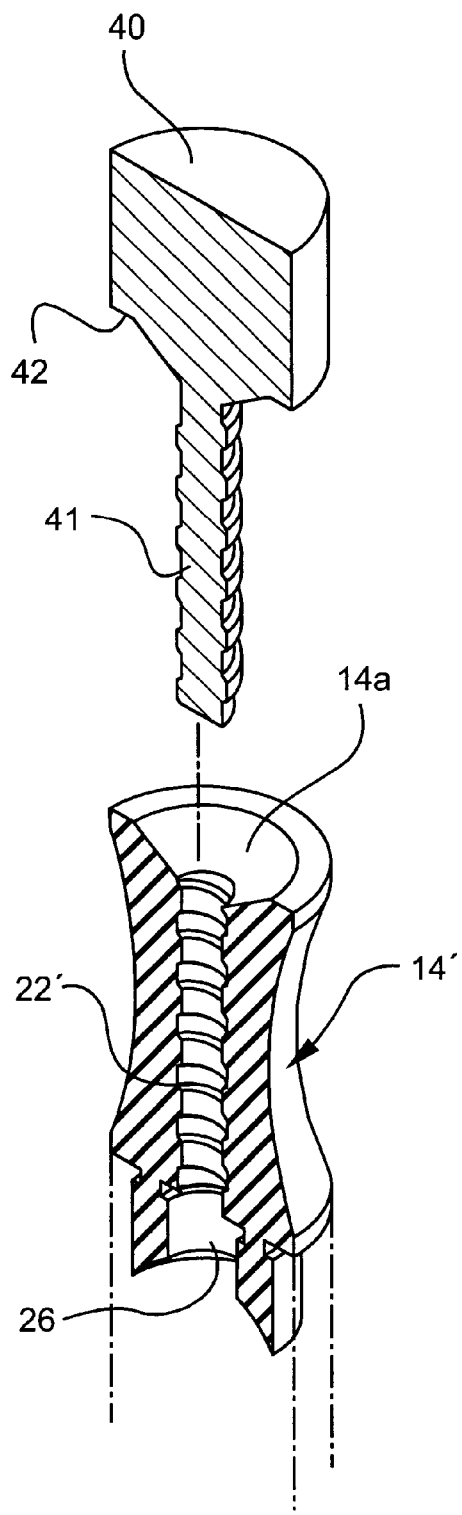
FIG. 1A is a longitudinal sectional view, partly in perspective, of the flexible sleeve segment of FIG. 1, illustrating an alternate embodiment wherein spiral-shaped ridges are formed on the interior wall of the central passageway of the sleeve segment, together with the plug member forming the aforesaid ridges.
Figure 1B:
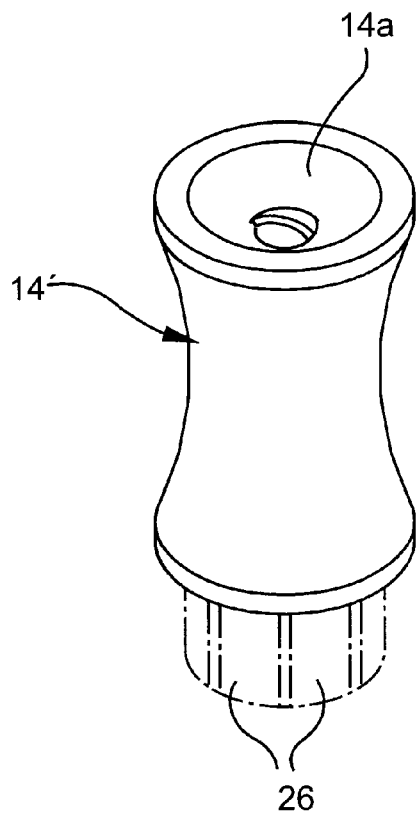
FIG. 1B is a perspective view of the flexible sleeve of FIG. 1A, illustrating the collar formed at the end of the flexible sleeve inside the housing for the applique.
Figure 1C:
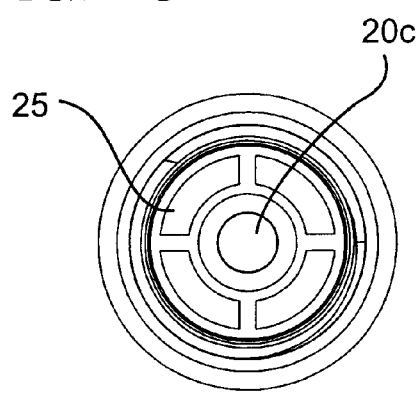
FIG. 1C is a top plan view of the applique housing container, illustrating the cavities in the housing into which the sleeve element is molded.

As also here preferably embodied, the open end of housing 12 includes a plurality of radially aligned cavities 25 extending circumferentially about the opening 20*c*. Advantageously, sleeve 14 is formed from a moldable plastic, such as, e.g., a plastic foam material, or elastomeric material, which is flexible, and yet self-supporting after molding, and which has sufficient tensile and tear strength to resist tearing upon twisting and/or stretching. Sleeve 14 thus may be securely affixed to housing 12 by a suitable molding process, such as injection molding, so as to fill cavities 25, as best seen in FIGS. 1A and 1B at numeral 26. While many suitable plastic or elastomeric materials will be readily known to those skilled in the molding art, it has been found that the material known as "HAPFLEX Series 1021", manufactured by the HAPCO Company of Hanover, Mass., performs satisfactorily and, at this time, is the preferred material for sleeve 14. Also advantageously, the inner end surface of cap 16 includes a sealing member, such as a gasket or washer 27 extending about the applicator—mounting rod 19 and is adapted to engage the end surface 14*a* of sleeve 14 in an airtight seal when cap 16 is secured to housing 12.

It will be seen from the foregoing that, as preferably embodied, my invention provides for the use of a flexible-walled, self-supporting sleeve segment which is deformable by finger pressure to wipe, or meter, excess mascara from the applicator brush, and yet which encloses the flexible sleeve and mascara product in an airtight seal to prevent the mascara from drying out before the contents of the container are fully emptied.

Referring now more particularly to FIG. 1A there is illustrated an alternate embodiment of my invention. As here embodied, the central passageway 22' of the flexible sleeve 14' is provided with a series of cork screw or thread-like spiral ridges and/or grooves to facilitate stripping or wiping of excess applique from the applicator as it is withdrawn from the container for the applique product.

Figure 2:
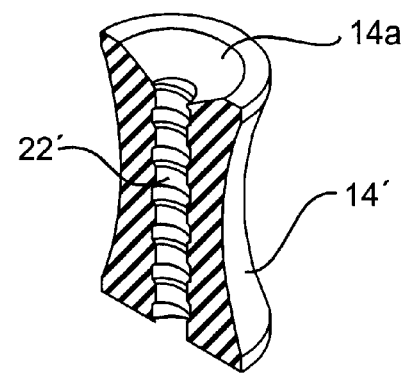
FIG. 2 is a line drawing of a second embodiment of my invention, showing assembly of the flexible segment to the applique housing section and also showing an inner lining extending along the walls of the applique housing and along the interior projections of the flexible segment and terminating in a circumferentially extending flap member adjacent the outer end of the flexible segment.
Figure 2:
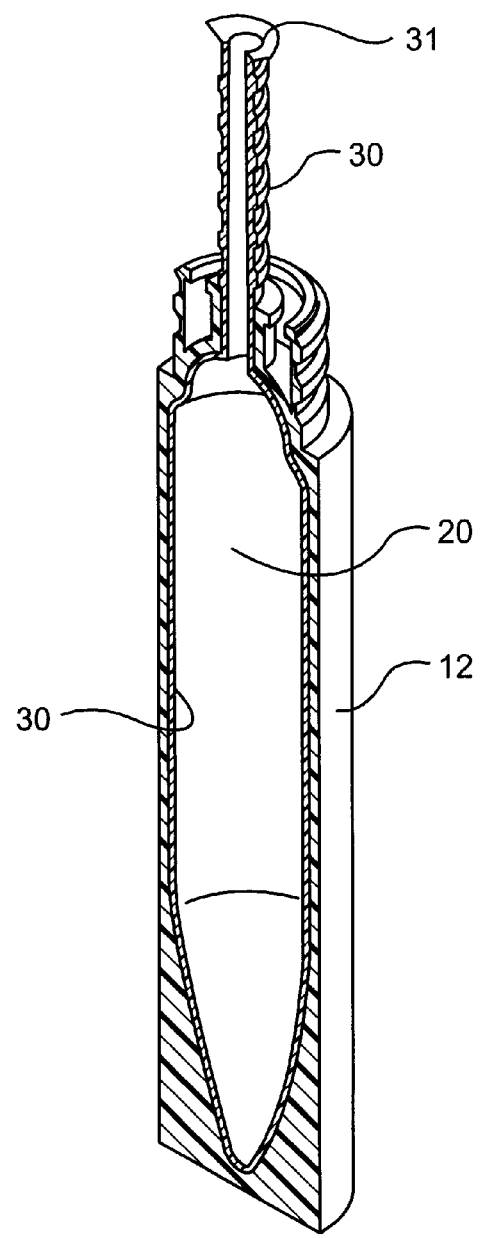
Figure 3:
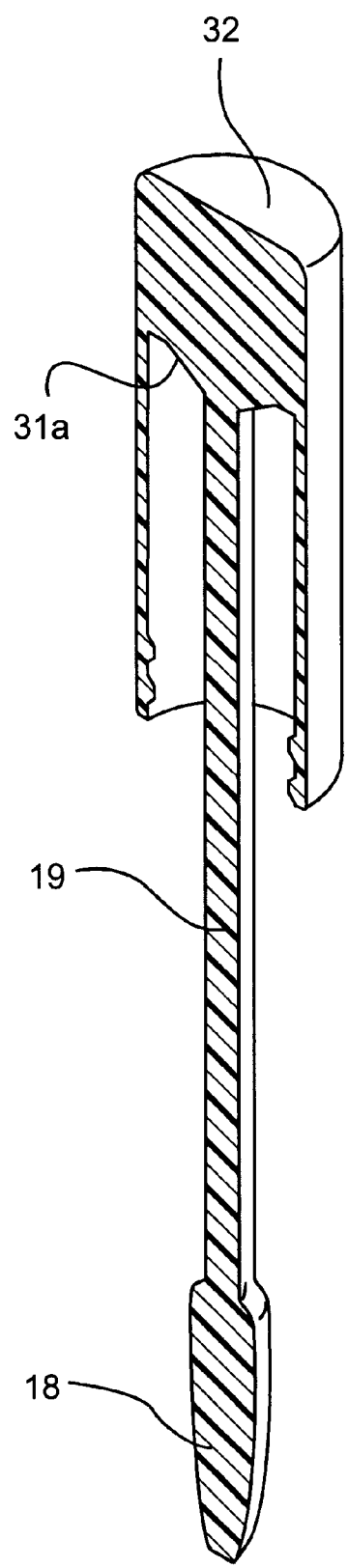
FIG. 3 is a line drawing illustrating in greater detail the cap and brush members of FIGS. 1 and 2.

Referring now more particularly to FIGS. 2–3, in a further embodiment of my invention, a thin, vapor-impermeable non-toxic plastic liner 30, such as, e.g., Saran, is provided on the interior surfaces of chamber 20 and passageway 22' of sleeve 14' and, advantageously, terminates in a disc-like flap 31 to thereby form a seal when mated with the inner end 31*a* of cap 32. Also, as best seen in FIG. 2, the central passageway 22' of flexible sleeve 14' advantageously may be formed with circular ridges or "teeth" to aid in wiping excess mascara product from the applicator brush. Also, in each of the foregoing alternative embodiments, caps 16 or 32 may be secured to housing 12 by means of mating screw threads, as shown, or by a snap-fit formed from a mating bead and groove mechanism (not shown).

Figure 4A:
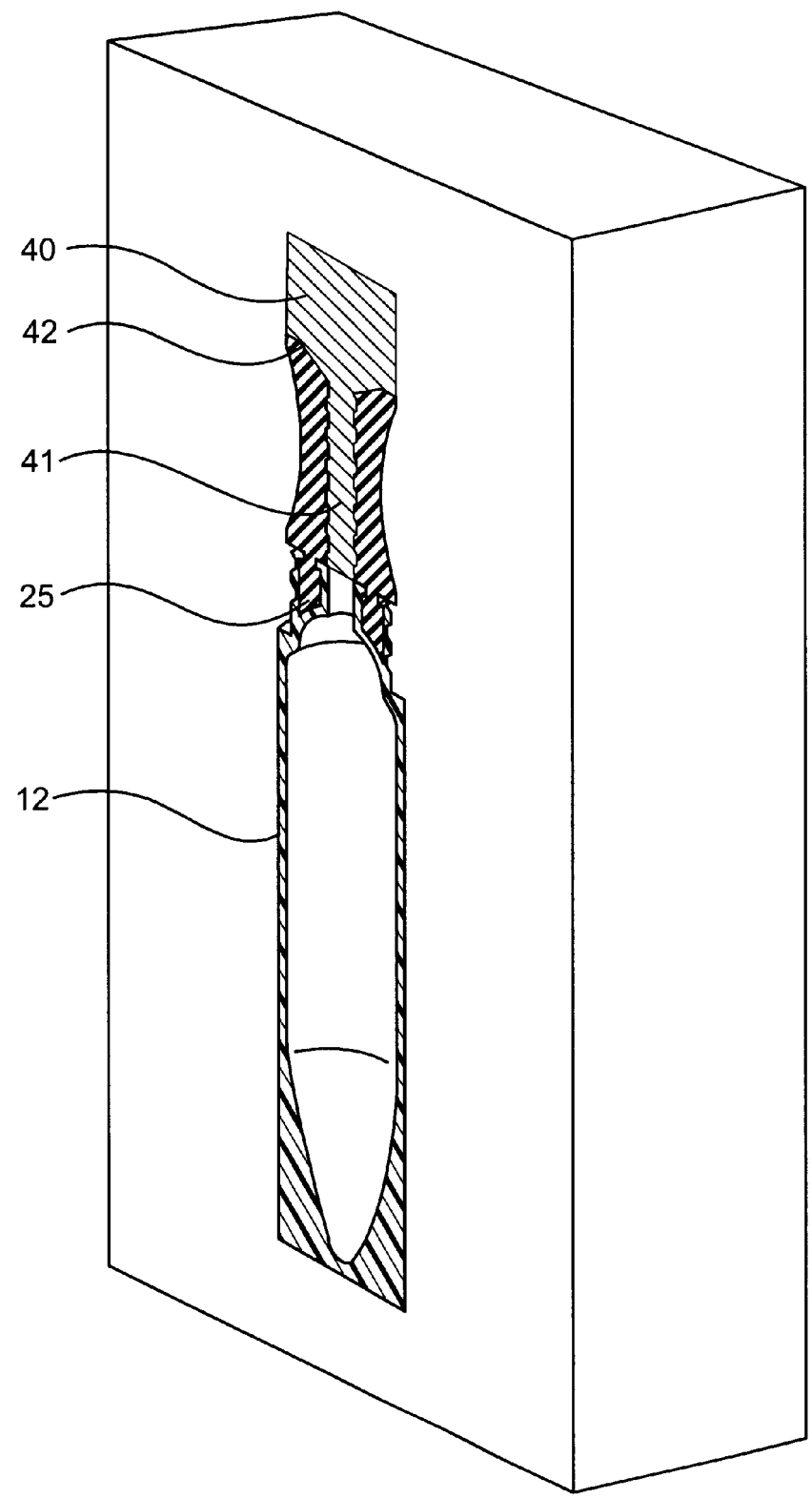
FIG. 4A is a line drawing, partly in perspective, illustrating a mold cavity and plug member for forming and bonding the flexible segment of my applique package to a pre-molded applique housing member in accordance with a preferred method of manufacture according to my invention.
Figure 4B:
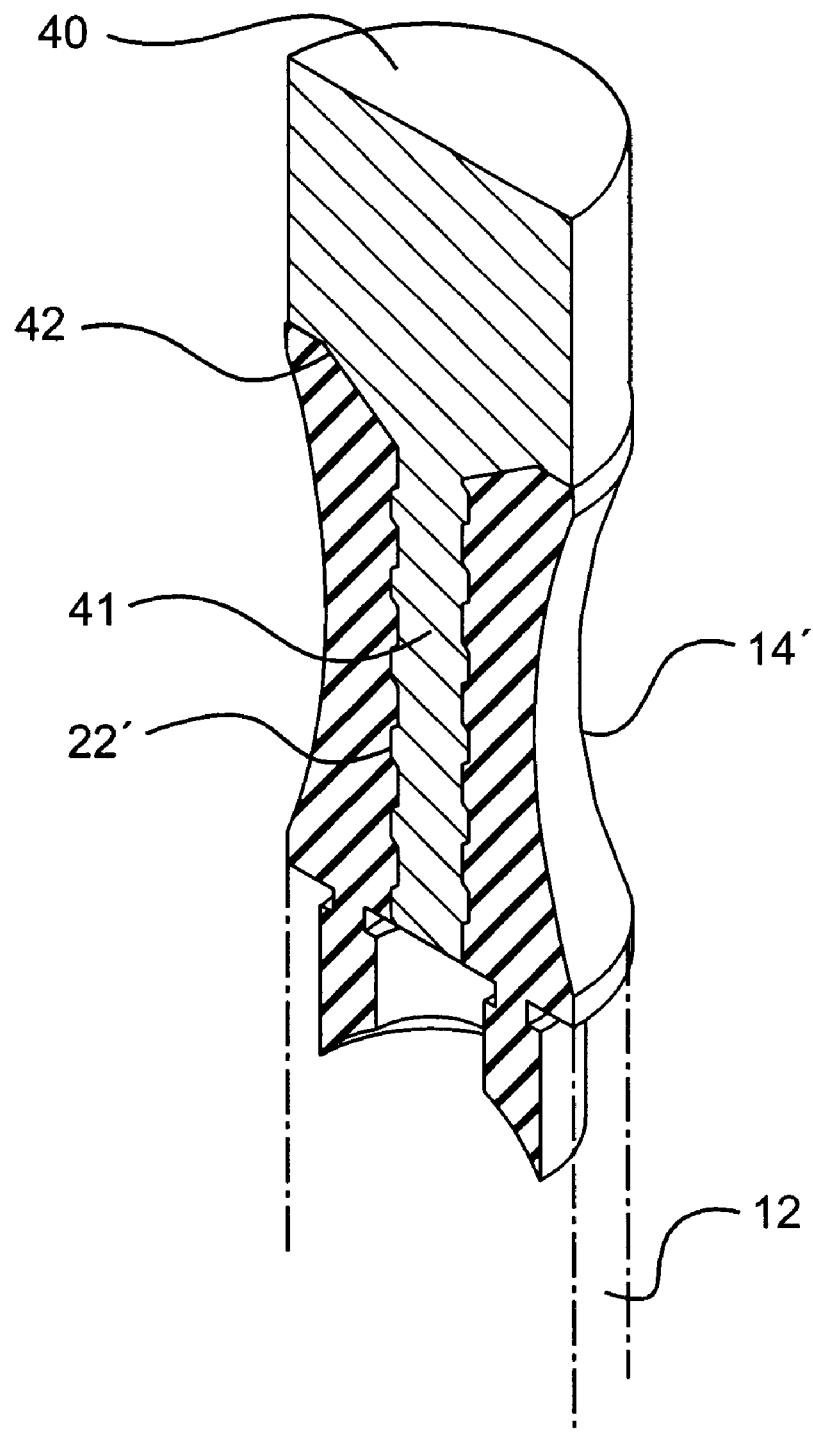
FIG. 4B is a partial enlarged perspective view of the plug and cavity members of FIG. 4A for forming the interior shape of the flexible segment of the preferred applique package embodiment of my invention.
Figure 4C:
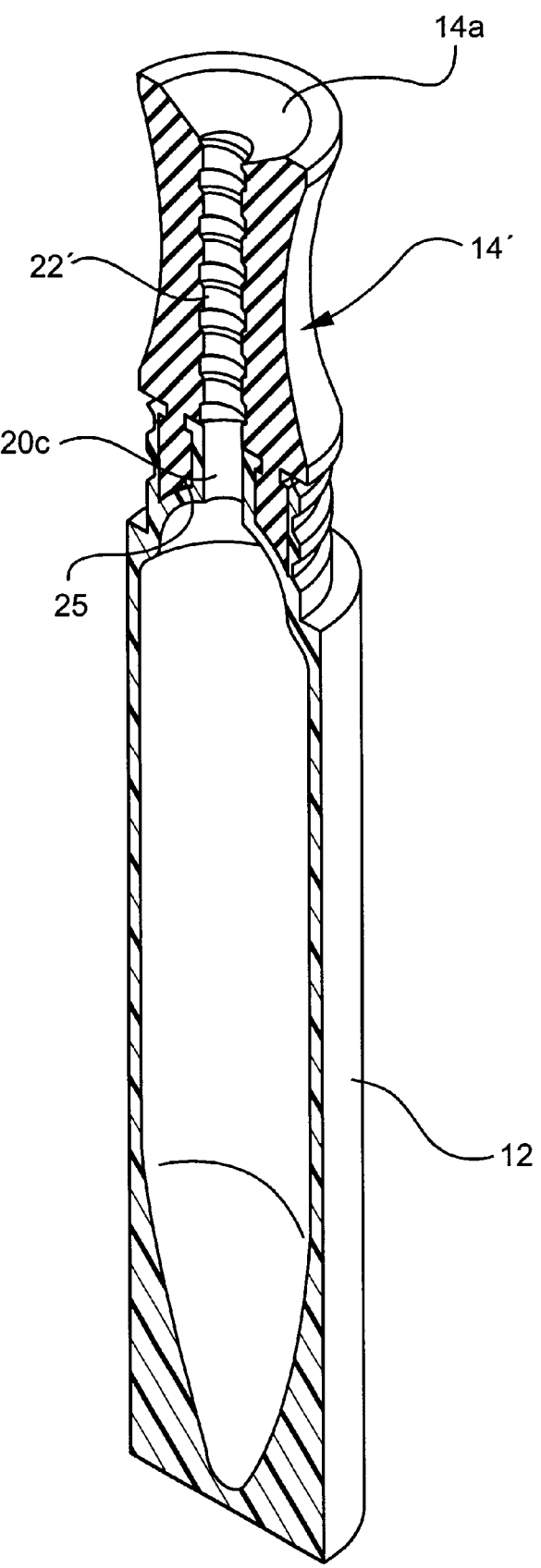
FIG. 4C is a line drawing, partly in perspective, illustrating the flexible segment of my invention affixed to the applique housing by overmolding the flexible segment into a series of notch-like openings or windows formed at the open end of the pre-molded applique housing member, in accordance with a preferred embodiment of the method of manufacture of my invention.

Referring now more particularly to FIGS. 4A–4C, there is illustrated a preferred method of manufacture of my invention. As here embodied, housing 12 is pre-molded from a relatively hard plastic material and, thereafter, the relatively soft plastic or elastomeric material forming the flexible sleeve 14 is overmolded, "through-molded", or injection molded so as to affix sleeve 14 to the housing 12 by filling cavities 25 previously formed in the end wall of housing 12.

The ridges or grooves provided on the interior surface of passageway 22' are preferably formed simultaneously with the molding of sleeve 14' by means of a plug 40 containing circumferentially extending frusto-conically shaped "tooth" members 41, as best seen in FIGS. 1A and 4B. Advantageously, plug 40 also includes a disc member 42 to create a purchase for receiving flap 31 when the housing 12 is provided with liner 30. It will be understood that, by providing tooth members 41 on a slight pitch and/or by tapering passageway 22' from one end to the other (see, in particular, FIGS. 9A, 10 and 11), sleeve 14' may be molded in a single step and the plug 40 thereafter easily removed by turning, as by unthreading of a screw.

Figure 5:
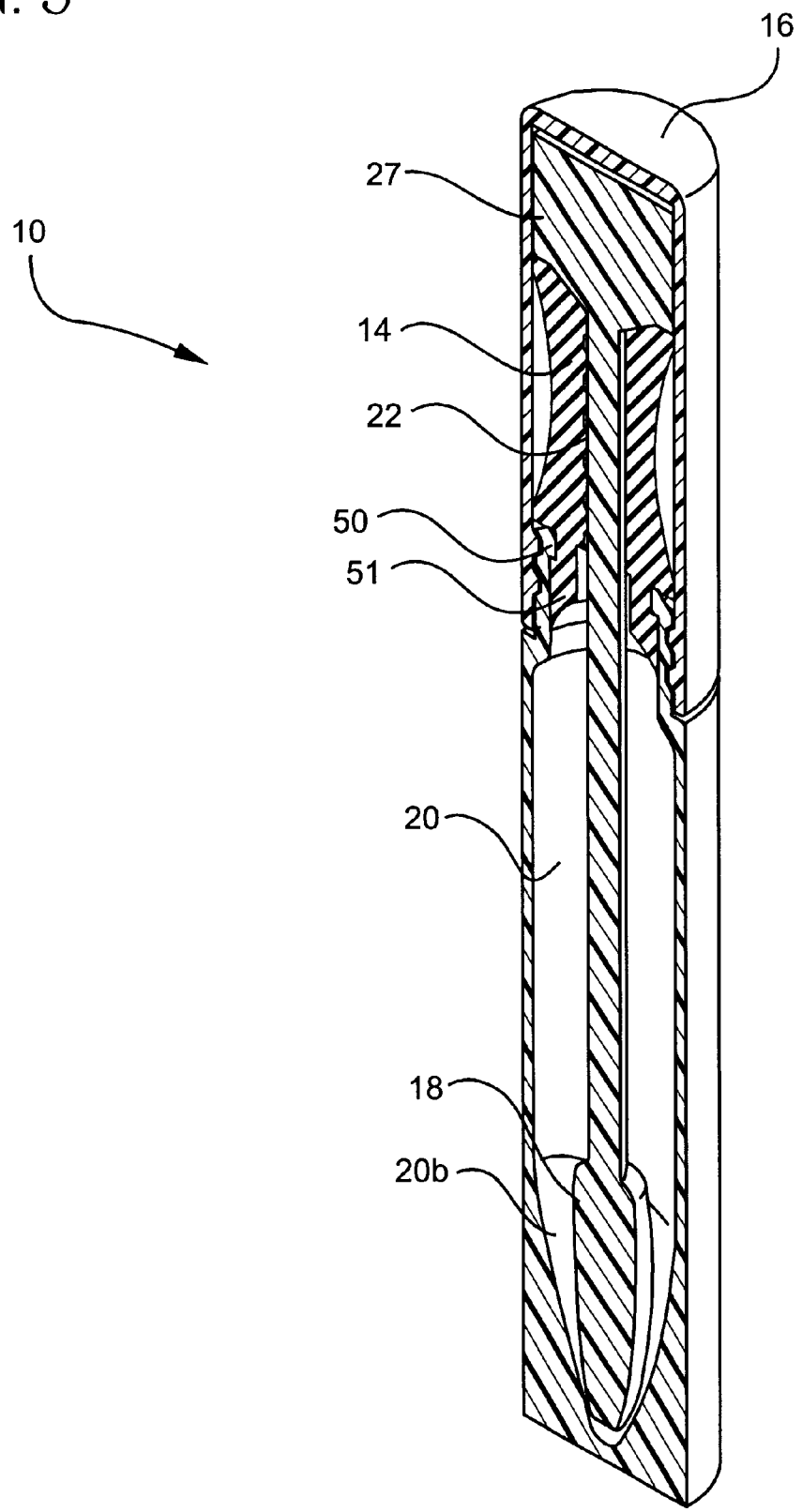
FIG. 5 is a line drawing taken generally in longitudinal section, partly in perspective, illustrating an alternate embodiment of my invention where the flexible sleeve segment is pre-molded and thereafter snap-fit and suitably bonded onto the applique housing member.
Figure 5A:
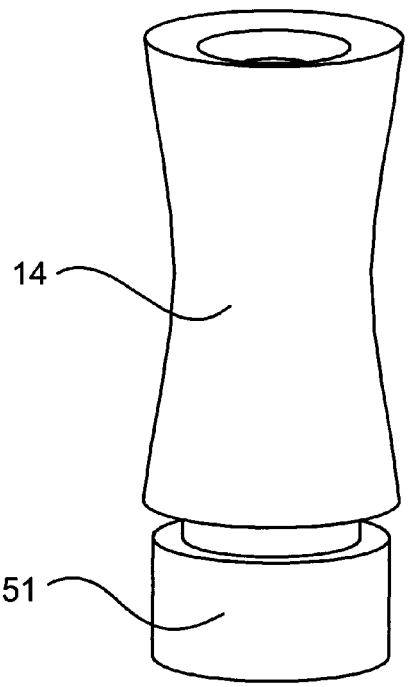
FIG. 5A is an enlarged perspective view of the deformable flexible segment illustrated in FIG. 5.

Referring now particularly to FIGS. 5–5A, there is illustrated a further alternate embodiment of my invention. As here embodied, the open end of housing 12 is provided with a small inwardly circumferentially extending ring or collar 50 and sleeve 14 is pre-formed with a lower similarly shaped clip ring 51 adapted to snap-fit under collar 50 to thereby mount sleeve 14 onto housing 12. A suitable bonding material may be applied to one or both of collar 50 and ring 51 to ensure a sealed connection between the sleeve and housing.

Figure 5B:
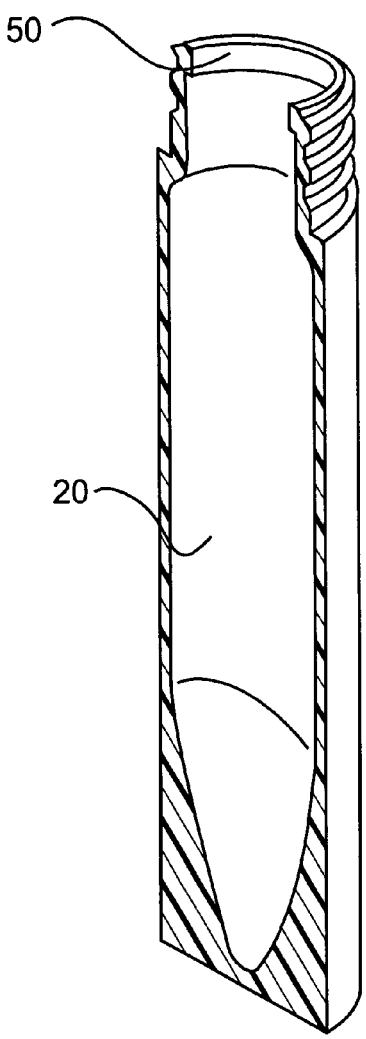
FIG. 5B is an enlarged sectional view of the housing member illustrated in FIG. 5.
Figure 6:
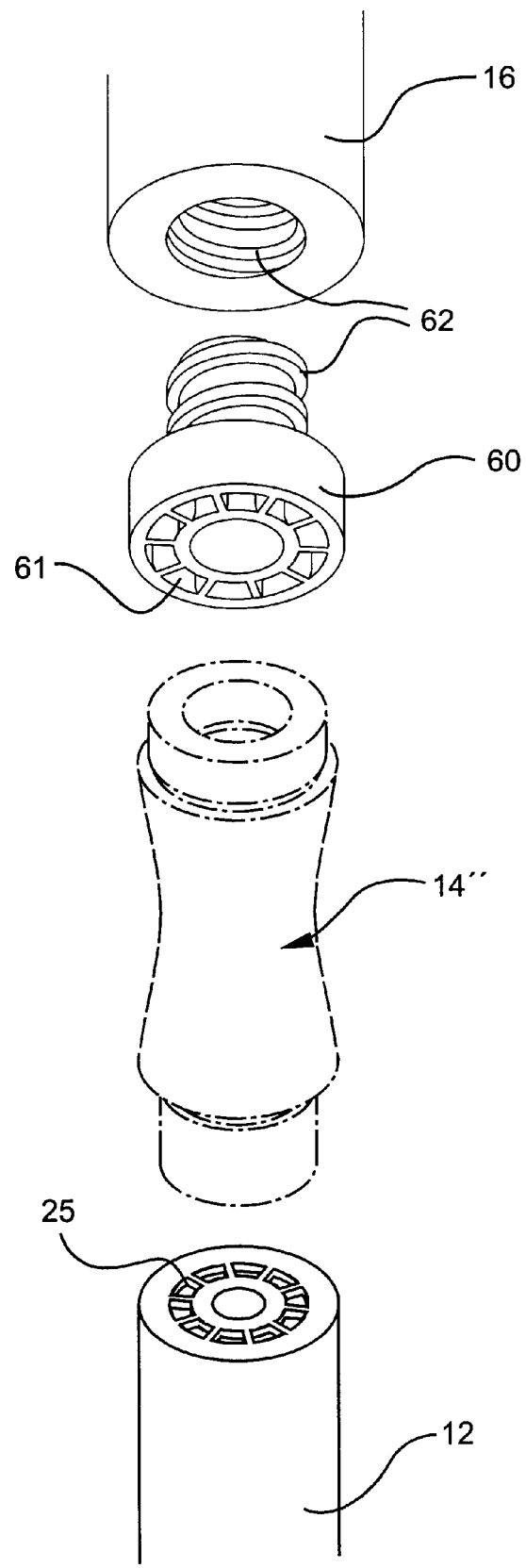
FIG. 6 is a fragmentary line drawing of a further preferred alternate embodiment of my invention, illustrating the flexible segment of my applique package affixed at one end to the applique housing member and at the other end to a rigid end plate or disc member to which a cap and brush member may be attached by mating threads, or snap-fit by mating bead and groove members, to thereby leave the flexible segment exposed to view upon completion of the manufacture of my applique package.

Referring now particularly to FIG. 5B, there is illustrated a still further alternate embodiment of the method of my invention. As here embodied, sleeves 14, 14' and/or 14" are pre-formed and thereafter assembled to housing 12 by a force fit, either in cavities 25 or under collar 50. As here embodied, a suitable bonding material may be applied to either or both of the housing and sleeve surfaces to ensure a fixed sealed connection upon assembly.

Referring now more particularly to FIGS. 6 and 8–11, there is illustrated a further preferred alternate embodiment of my invention. As here embodied, sleeve 14" is secured by molding directly to both housing 12 and, at its opposite end, to a rigid disc member 60, also containing open cavities 61 into which sleeve 14" is fixedly mounted during the molding process. Here again, a suitable bonding material may be applied to the cavity walls to ensure a sealed connection between the sleeve and the plate member. Cap 16 is removably secured to disc 60 by mating threads 62 or, alternatively, by a bead-and-groove snap fit. It will be understood that, in this embodiment of my invention, the exterior peripheral surface of sleeve 14" is exposed upon completion of manufacture. Thus, this embodiment is preferably used when the applique product does not require an additional seal or outer cover member to prevent premature drying.

Figure 9:
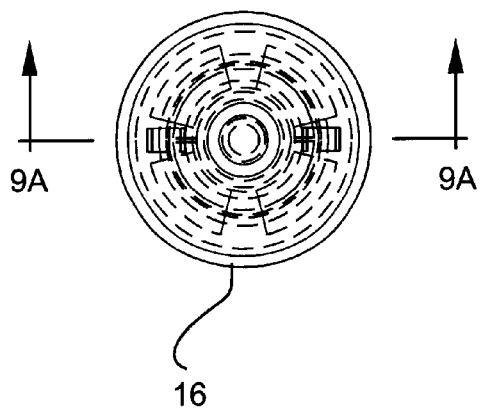
FIG. 9 is a view in end elevation of one end of the applique package illustrated in FIG. 8.
Figure 9A:
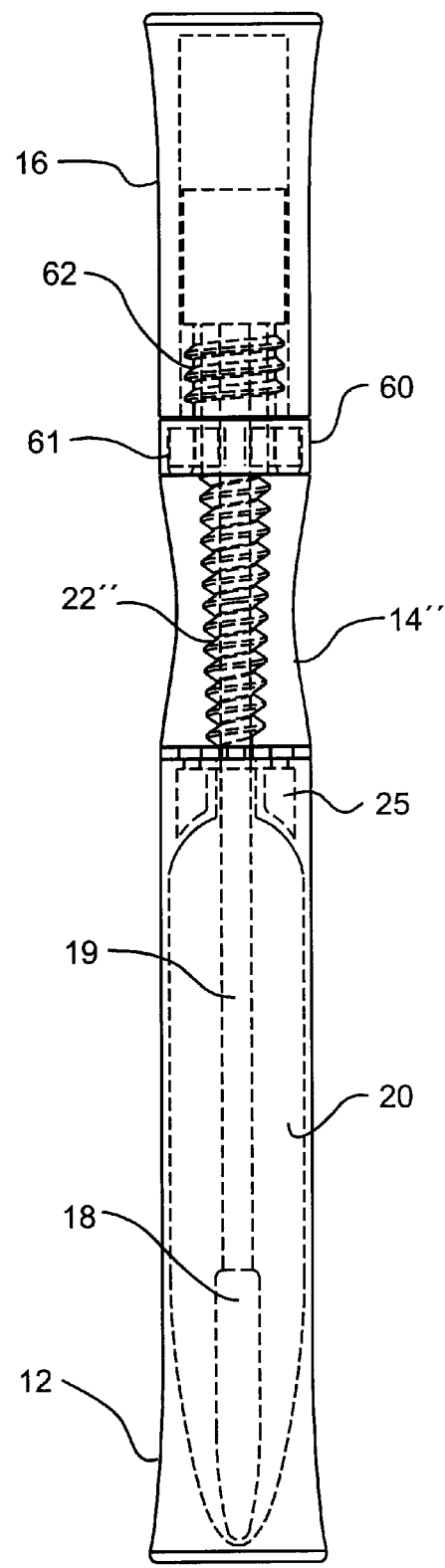
FIG. 9A is a longitudinal sectional view, partly in elevation, taken along line 9A—9A of FIG. 9, this view, in particular, illustrating the grooved central passageway of the flexible segment, and also illustrating the threaded connection between the cap member and the outer plate to which the flexible segment is bonded.
Figure 10:
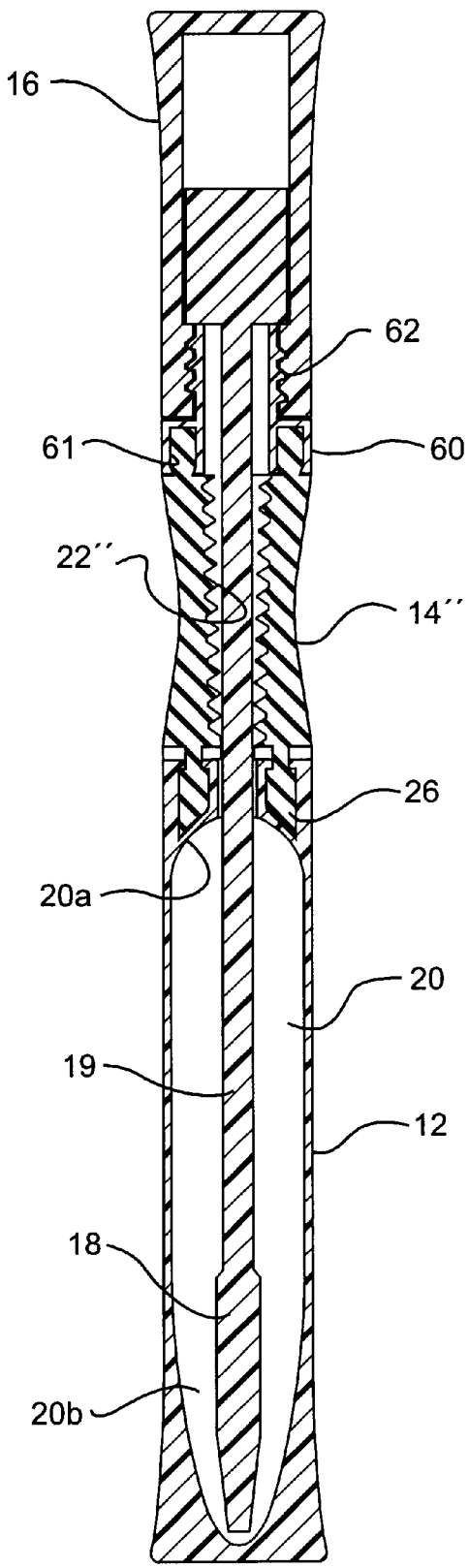
FIG. 10 is a longitudinal sectional view, partly in elevation, of the applique package of FIG. 8, this view illustrating each of the applique reservoir, flexible intermediate section, cap and mascara applicator.
Figure 11:
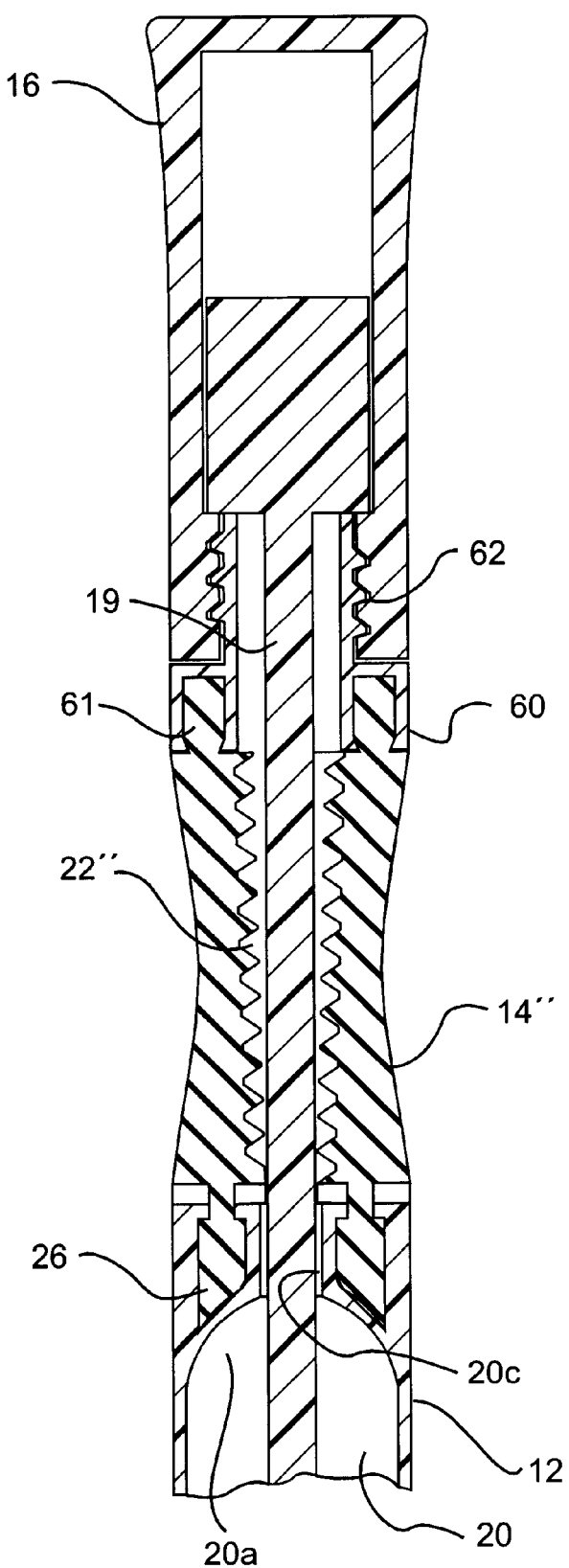
FIG. 11 is a fragmentary, enlarged view of the intermediate flexible portion of FIG. 10, illustrating, in particular, the tapered and grooved interior surface of the flexible sleeve passageway, the molded affixation of the flexible sleeve to each of the container housing and outer plate and the threaded connection of the cap member to the outer surface of the plate member.
Figure 12:
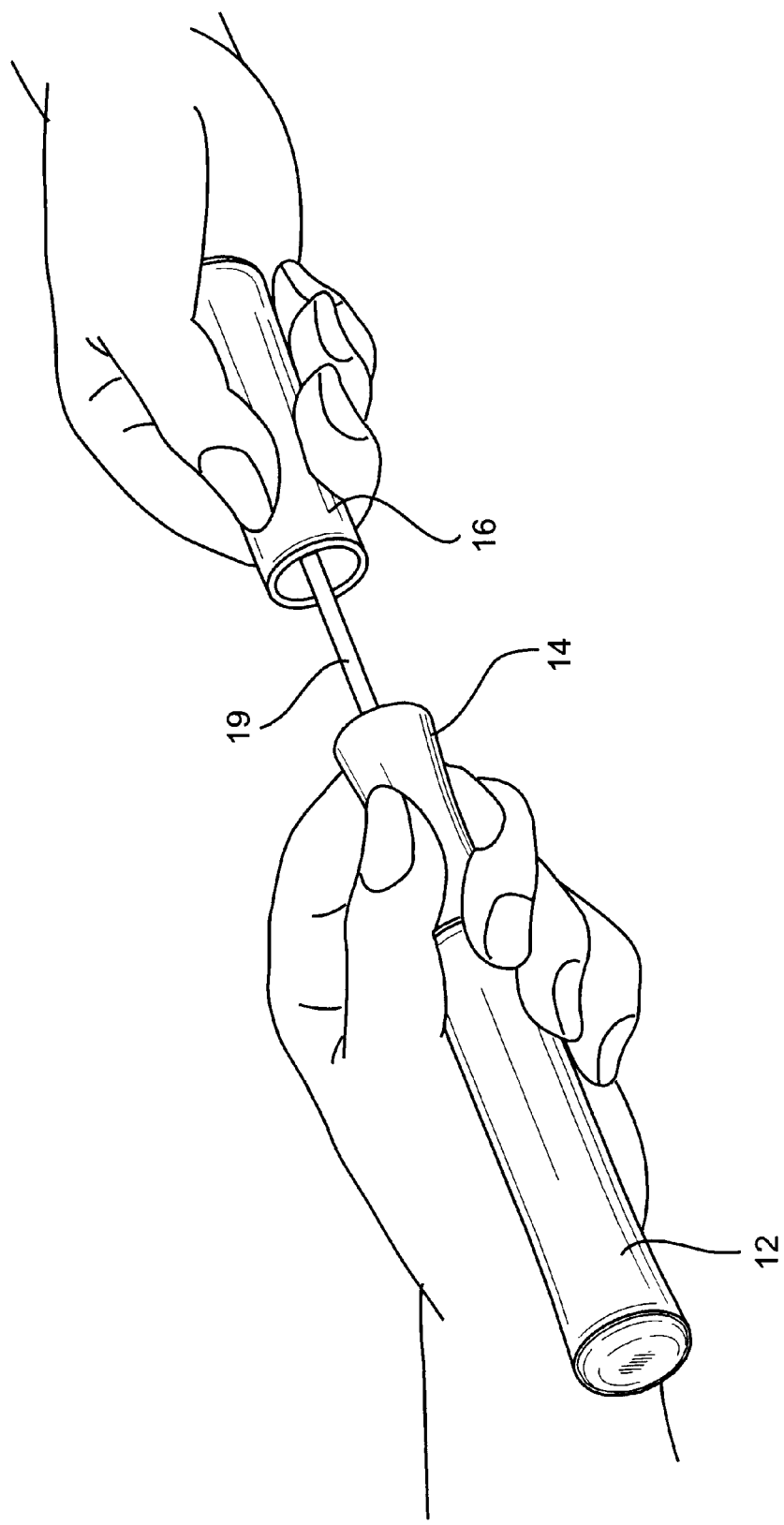
FIG. 12 is a perspective view of an applique package constructed in accordance with the preferred embodiment of my invention, illustrating a user withdrawing an applicator from the package while simultaneously squeezing and manipulating the flexible control sleeve against the applicator to thereby dispense the desired amount of applique on to the applicator.

As best seen in FIGS. 9A and 11, the grooved interior passageway 22" of sleeve 14" preferably is tapered from its outermost end toward the end thereof that is mounted to the housing 12. Advantageously, the narrowest portion of passageway 22" permits the applicator 18 to pass therethrough substantially without interference. It will be seen that this construction enables the bulk of the mascara or other applique material to be wiped from the applicator before the applicator reaches the outer end of the sleeve, thereby ensuring that excess applique is funneled and drained back into the reservoir, preventing the applique from building up and/or clogging at the open end of the sleeve passageway.

Figure 7:
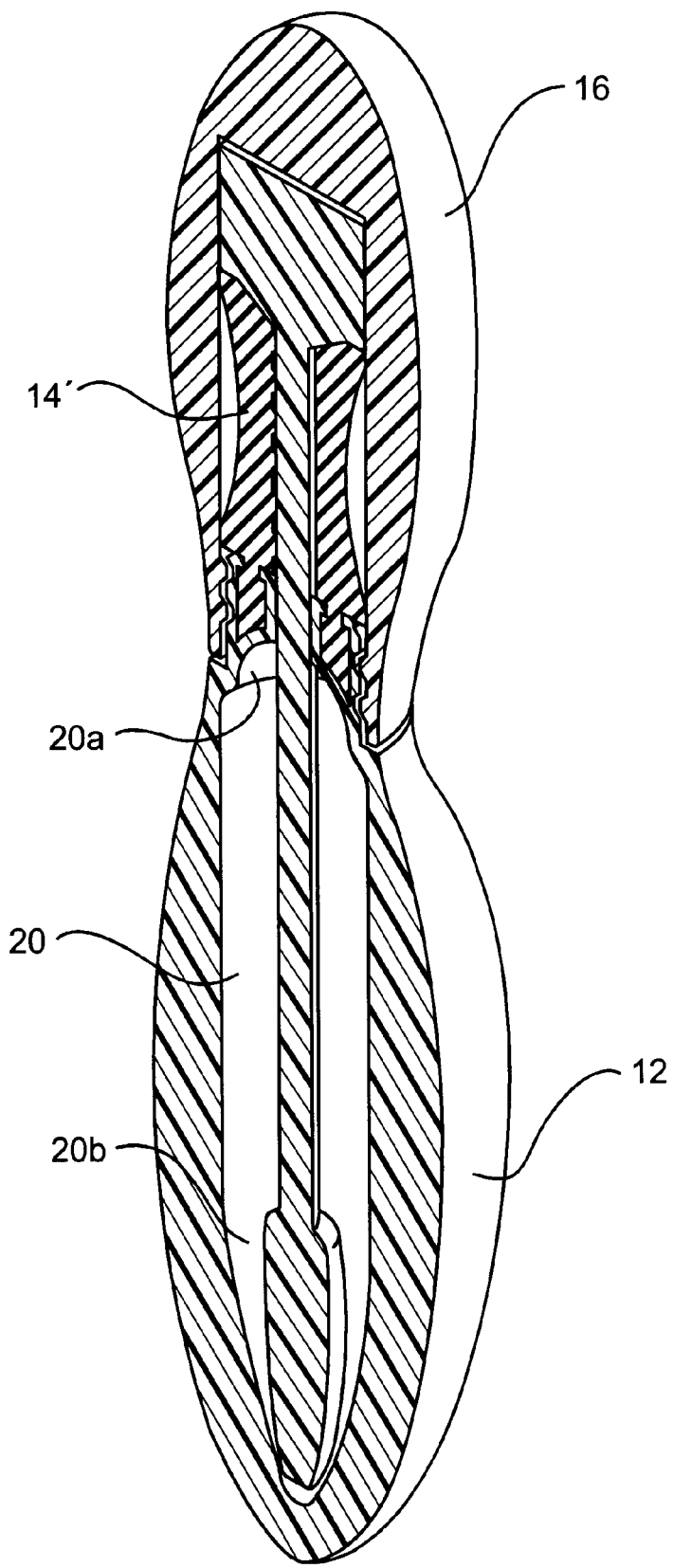
FIG. 7 is a longitudinal sectional view of a further alternate embodiment of my invention where the cap and housing members are rounded to provide ergonomic gripping surfaces and the flexible-walled deformable segment is narrowed for easier gripping and manipulation by finger pressure.
Figure 7A:
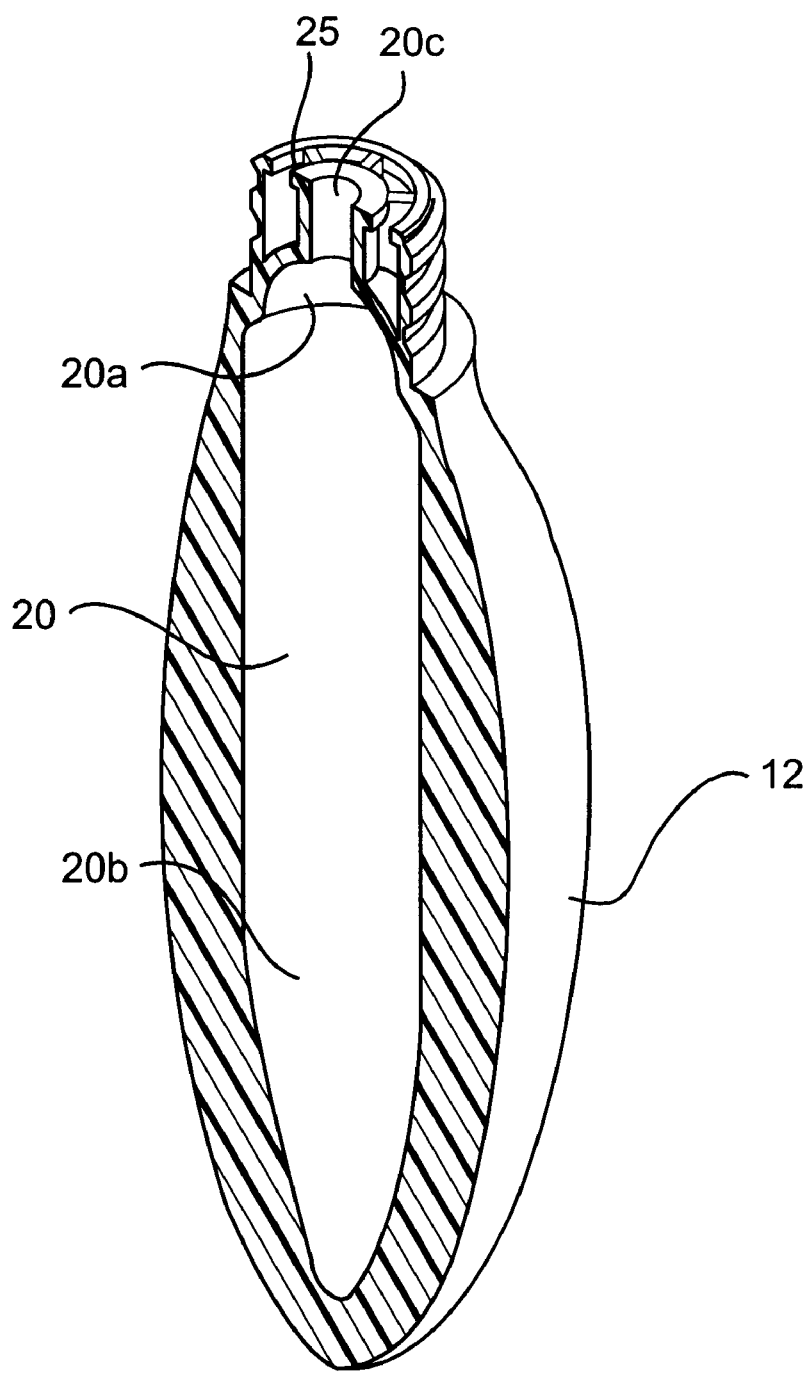
FIG. 7A is a longitudinal sectional view of the applique container housing illustrated in FIG. 7.
Figure 7B:
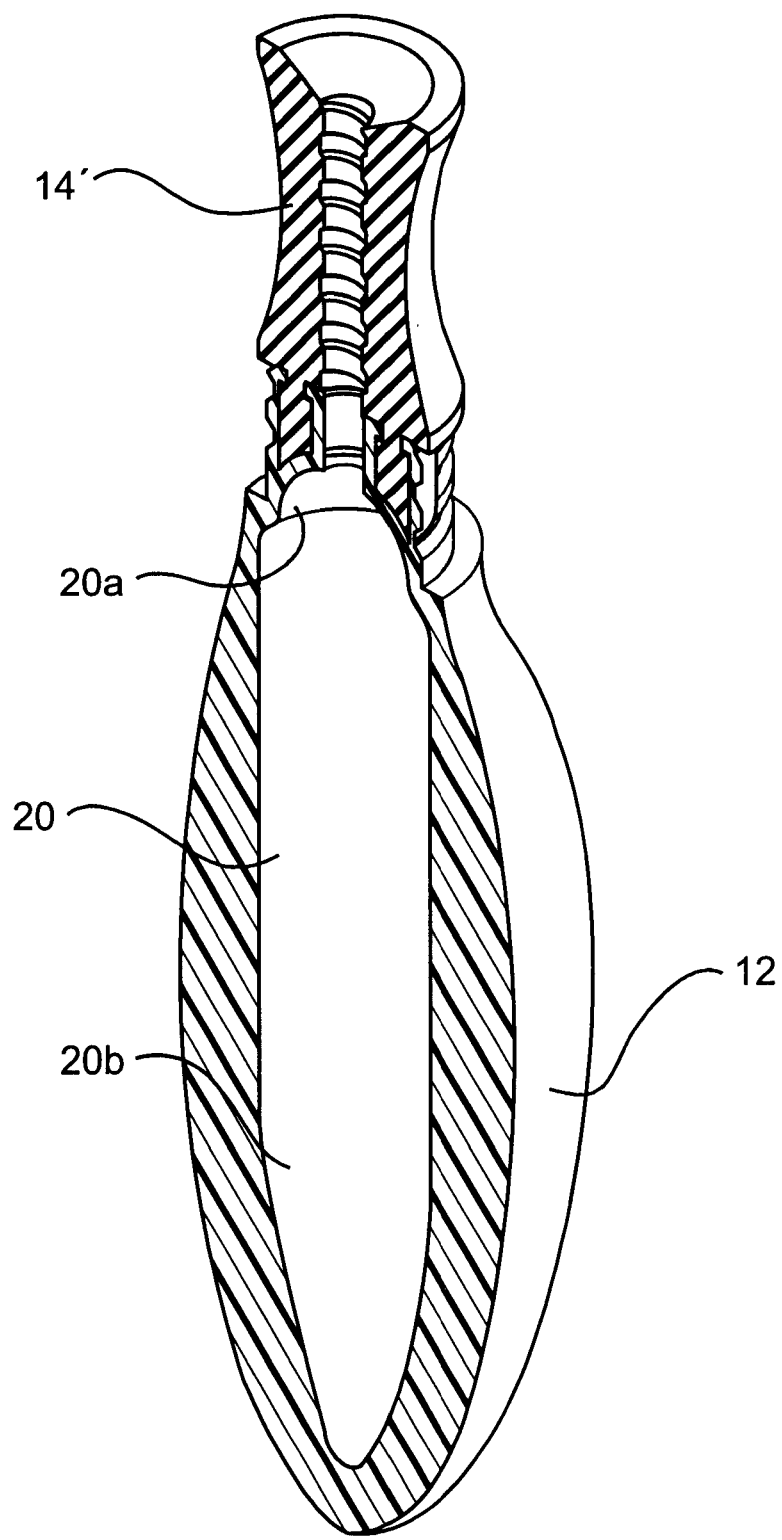
FIG. 7B is a longitudinal sectional view of the embodiment illustrated in FIG. 7, this view illustrating the interior flexible control sleeve affixed to the housing member.
Figure 8:
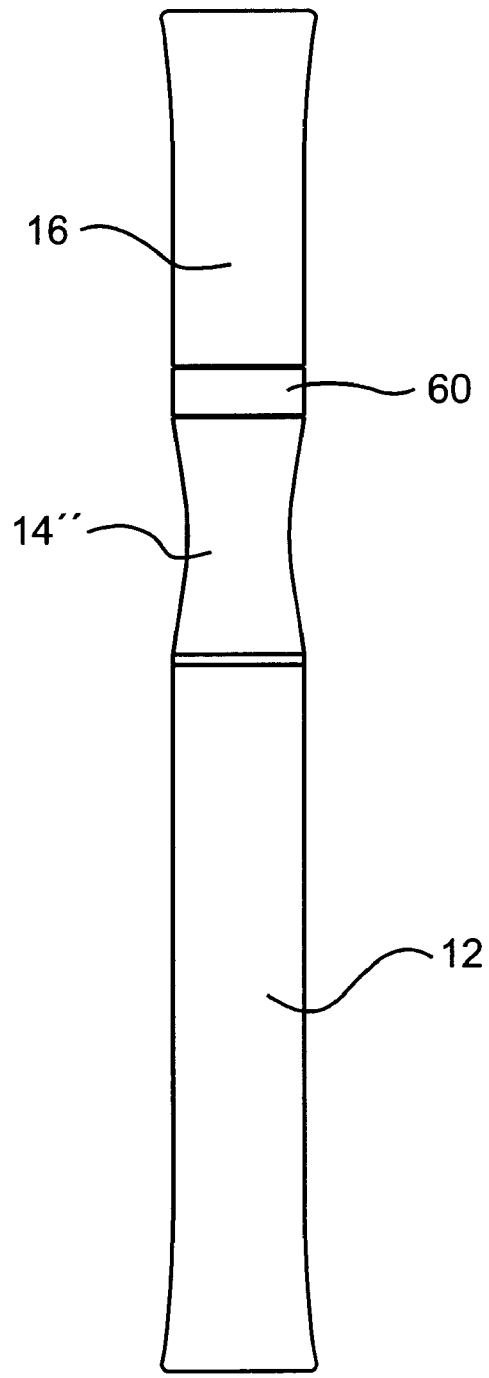
FIG. 8 is a plan view of a complete applique package similar to the preferred alternate embodiment of my invention illustrated in FIG. 6, this view illustrating an applique housing member at one end and a removable cap member at the other end, separated by the flexible, deformable segment attached at its opposed ends to the aforesaid housing and cap members, to thereby leave the flexible segment exposed to view after manufacture; in addition, in this embodiment the exterior wall of the flexible segment is narrowed along its central portion for easier gripping and manipulation by finger pressure.

It will be understood from the foregoing that my invention is not limited to any particular shape or configuration for the applique container, cap or the flexible sleeve segment. Thus, its overall shape may be a generally elongated cylindrical shape, much like that of a fountain pen, as illustrated in FIGS. 1 and 8. Alternatively, as illustrated in FIGS. 7–7B, the applique housing may have a slightly convex curvature, or as illustrated in FIGS. 8–11, the outer wall of the flexible sleeve segment may be narrowed to form a concave or other desired surface curvature, for ease of gripping and manipulation by finger pressure, and/or as shown in FIG. 7, the cap member may be enlarged and rounded to provide a bulbous, more ergonomic handle for ease of gripping and control of the applicator brush.

It therefore will remain understood by those skilled in the art that the present invention in its broader aspects is not limited to the particular embodiments shown and described herein, and that variations may be made without departing from the principles of the invention and without sacrificing its chief advantages.

I claim:

1. A package for storing an applique material and for dispensing a desired amount of said material on an applicator, said package including:

a housing member for storing a quantity of said applique material, said housing including a reservoir chamber having a closed bottom end and a top opening, an open-ended passageway communicating with said reservoir top opening, and open-ended cavity means extending into said housing adjacent said passageway;

a cap member for sealingly closing said package, said cap including a rod member, means mounting one end of said rod member to said cap member, said rod member having a free end extending outwardly from said cap;

an applicator mounted to the free end of said rod member, said applicator adapted to rest adjacent the bottom of said reservoir when said cap member sealingly closes said package;

an open-ended, self-supporting, deformable sleeve member having a central passageway communicating with the opposed first and second open ends thereof, said passageway adapted to receive said applicator therethrough substantially without interference when said sleeve is in its undeformed state, said passageway also adapted to provide a continuously variable interference surface against said applicator upon applying inward finger pressure directly against the exterior surface of said sleeve, so as to squeeze and manipulate said sleeve while simultaneously withdrawing said applicator from said reservoir through said passageway, to thereby dispense the desired amount of applique on said applicator;

means fixedly and sealingly mounting said first open end of said sleeve member within said housing cavity means with each of said sleeve and housing passageways in register with one another; and means for sealingly mounting said second open end of said sleeve member to said cap member when said applicator rod member extends through said sleeve member and said applicator is positioned adjacent the bottom of said reservoir, wherein said passageway in said deformable sleeve member tapers from said second open end toward said first open end, said first open end adapted to receive said applicator therethrough substantially without interference when said sleeve is in its undeformed state.

2. A package for storing an applique material and for dispensing a desired amount of said material on an applicator, said package including:

a housing member for storing a quantity of said applique material, said housing including a reservoir chamber having a closed bottom end and a top opening, an open-ended passageway communicating with said reservoir top opening, and open-ended cavity means extending into said housing adjacent said passageway;

a cap member for sealingly closing said package, said cap including a rod member, means mounting one end of said rod member to said cap member, said rod member having a free end extending outwardly from said cap;

an applicator mounted to the free end of said rod member, said applicator adapted to rest adjacent the bottom of said reservoir when said cap member sealingly closes said package;

an open-ended, self-supporting, deformable sleeve member having a central passageway communicating with the opposed first and second open ends thereof, said passageway adapted to receive said applicator therethrough substantially without interference when said sleeve is in its undeformed state, said passageway also adapted to provide a continuously variable interference surface against said applicator upon applying inward finger pressure directly against the exterior surface of said sleeve, so as to squeeze and manipulate said sleeve while simultaneously withdrawing said applicator from said reservoir through said passageway. to thereby dispense the desired amount of applique on said applicator;

means fixedly and sealingly mounting said first open end of said sleeve member within said housing cavity means with each of said sleeve and housing passageways in register with one another;

means for sealingly mounting said second open end of said sleeve member to said cap member when said applicator rod member extends through said sleeve member and said applicator is positioned adjacent the bottom of said reservoir; and a thin, flexible, continuous liner material coating the interior surfaces of each of said reservoir, said housing passageway and said sleeve passageway and terminating in a laterally extending flap engaging the end surface of said second end of said deformable sleeve member.

3. A package for storing an applique material and for dispensing a desired amount of said material on an applicator, said package including:

a housing member for storing a quantity of said applique material, said housing including a reservoir chamber having a closed bottom end and a top opening, an open-ended passageway communicating with said reservoir top opening, and open-ended cavity means extending into said housing adjacent said Passageway;

a cap member for sealingly closing said package, said cap including a rod member, means mounting one end of said rod member to said cap member, said rod member having a free end extending outwardly from said cap;

an applicator mounted to the free end of said rod member, said applicator adapted to rest adjacent the bottom of said reservoir when said cap member sealingly closes said package;

an open-ended, self-supporting, deformable sleeve member having a central passageway communicating with the opposed first and second open ends thereof, said passageway adapted to receive said applicator therethrough substantially without interference when said sleeve is in its undeformed state, said passageway also adapted to provide a continuously variable interference surface against said applicator upon applying inward finger pressure directly against the exterior surface of said sleeve, so as to squeeze and manipulate said sleeve while simultaneously withdrawing said applicator from said reservoir through said passageway, to thereby dispense the desired amount of applique on said applicator;

means fixedly and sealingly mounting said first open end of said sleeve member within said housing cavity means with each of said sleeve and housing passageways in register with one another;

means for sealingly mounting said second open end of said sleeve member to said cap member when said applicator rod member extends through said sleeve member and said applicator is positioned adjacent the bottom of said reservoir, wherein said cap member is adapted to fit over and about each of said deformable sleeve member and said housing member;

each of said cap member and said housing member includes means for removably securing them together; and said second end of said deformable sleeve member sealingly engages said cap member when said cap and housing members are secured together.

4. A method for manufacturing a package for storing and dispensing a desired amount of an applique fluid material on an applicator, including the steps of:

pre-forming a housing member for storing a quantity of said applique material, said housing including an open end and further including cavity means adjacent said opening;

pre-forming a cap member for sealingly closing said package, said cap member including a rod mounted within said cap member and an applicator mounted to the distal end of said rod member, said applicator adapted to rest adjacent to the bottom of said housing when said cap member closes said package;

placing said pre-formed housing member in a molding die and plug adapted to form an open ended, self-supporting sleeve member having a central passageway communicating with the opposed first and second open ends thereof, said passageway adapted to receive said applicator therethrough substantially without interference;

filling a moldable material into said molding die and plug, thereby filling said housing cavity means with said moldable material and forming said sleeve member, whereby said sleeve member is sealingly connected to each of said housing member and said cap member when said cap member closes said package, wherein said cap member is adapted to fit over and about each of said sleeve member and said housing member;

each of said cap and housing members including means for being removably secured together; and the end of said sleeve member opposite said housing member sealingly engages the inner end of said cap member when said cap and housing members are secured together.

* * * * *